United States Patent [19]

Corte

[11] 4,262,822

[45] Apr. 21, 1981

[54] CAULKING DEVICE

[76] Inventor: Vincent C. Corte, 2206 Palomino Dr., San Antonio, Tex. 78227

[21] Appl. No.: 910,220

[22] Filed: May 30, 1978

[51] Int. Cl.[3] .......... G01F 11/00

[52] U.S. Cl. .......... 222/174; 222/391; 401/140; 401/280; 239/578

[58] Field of Search .......... 222/174, 474, 473, 173, 222/391; 239/578, 280, 280.5, 281; 401/138, 140; 124/34; 408/136

[56] References Cited

U.S. PATENT DOCUMENTS

| | | | |
|---|---|---|---|
| 1,325,437 | 12/1919 | Dertouzos | 222/174 X |
| 2,073,170 | 3/1937 | Pieper | 401/138 |
| 2,778,541 | 1/1957 | Sherbondy | 222/391 X |
| 3,069,095 | 12/1962 | Bishop | 222/174 X |
| 3,726,440 | 4/1973 | Deeb | 222/174 |
| 4,089,440 | 5/1978 | Lee | 222/174 |

FOREIGN PATENT DOCUMENTS

| | | | |
|---|---|---|---|
| 890057 | 10/1943 | France | 124/34 |

*Primary Examiner*—Robert J. Spar
*Assistant Examiner*—Frederick R. Handren
*Attorney, Agent, or Firm*—John C. Stahl

[57] ABSTRACT

A caulking device consisting of an elongated holder and a conventional caulking gun secured thereto, said caulking gun including a handle and spring biased trigger and adapted to receive a disposable cartridge of caulking compound or other composition, a second handle on said holder, a second trigger pivotally mounted on said second handle, a cable connected to said triggers whereby said second trigger selectively actuates said caulking gun to extrude the composition in said cartridge at a remote location.

6 Claims, 7 Drawing Figures

CAULKING DEVICE

BACKGROUND OF THE INVENTION

Extended caulking guns for reaching elevated heights are well known in the art. In general, in each of these teachings the handle is essentially perpendicular to the longitudinal axis of the caulking gun, a pressure rod extends the approximate entire length of said caulking gun, and a guide tube is often utilized to prevent bowing or deflection of said pressure rod.

It is evident that the use of such elongated pressure rod, either independently or in combination with said guide tube, provides additional weight which restricts mobility and/or requires extra exertion to operate the same. During use, the wrist of the user is often bent at an unnatural angle in grasping the handle. Furthermore, in the fully retracted position the pressure rod extends substantially rearwardly of the handle and thrusts into or bears against the arm or shoulder of the user thereby restricting free movement.

SUMMARY OF THE INVENTION

The principal object of the invention is to provide an elongated caulking device which utilizes a conventional caulking gun with minimal modifications to such caulking gun.

Another object is to provide a light weight caulking device wherein the major axis of the handle of the holder lies in a plane approximately paralleling the longitudinal axis of said holder thereby minimizing strain on the wrist and permitting unrestricted movement of said caulking device by the user.

A further object is to provide such a caulking device which is simple in construction, inexpensive to manufacture, capable of mass production techniques, and universal in its adaptability.

Other objects and features of the invention will become apparent to those skilled in the art from a consideration of the following specification when read in the light of the annexed drawings.

DESCRIPTION OF PREFERRED EMBODIMENTS

Figures 1, 2, 3, 4, 5, 6, 7:
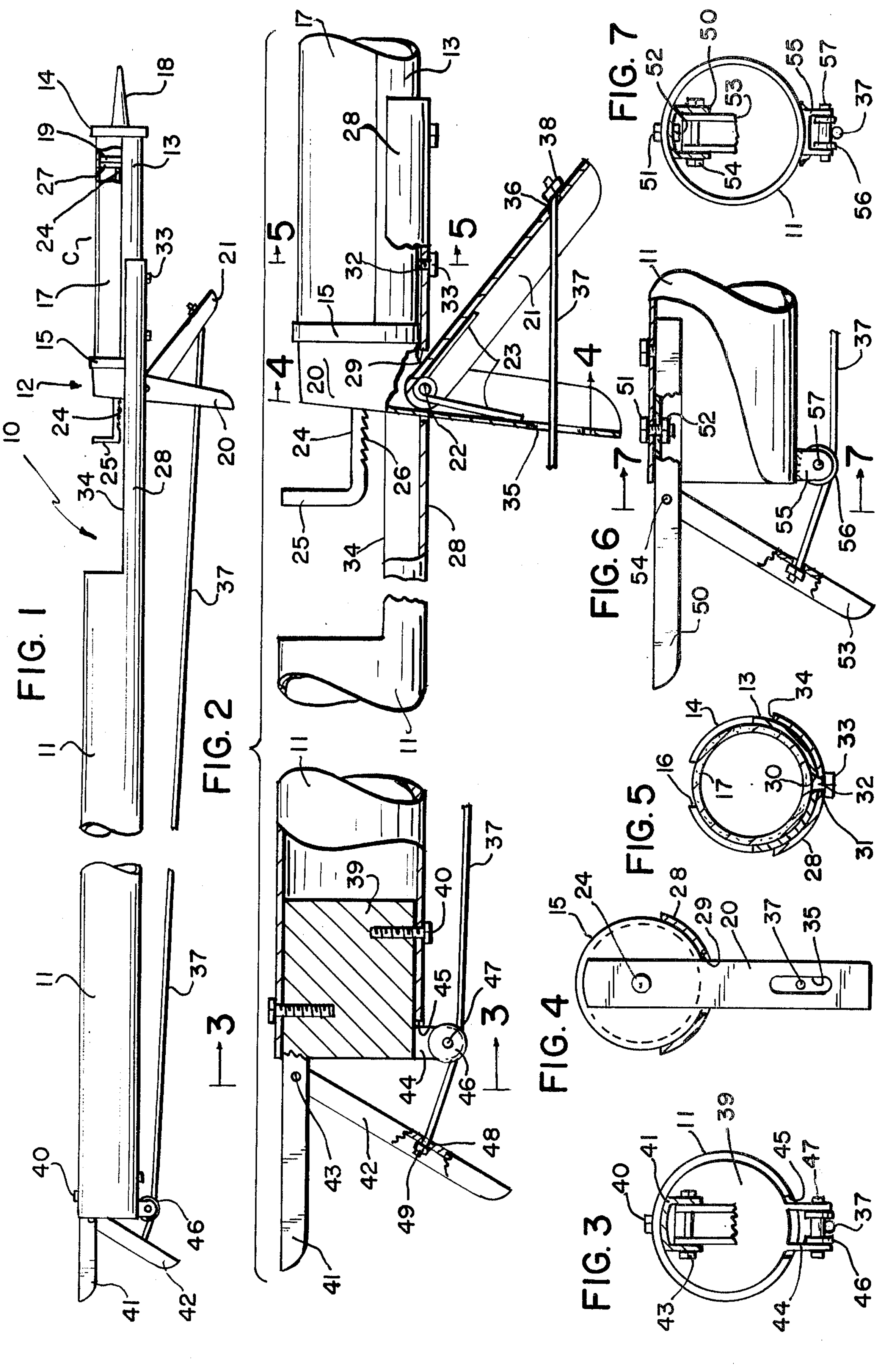
FIG. 1 is a side elevational view, partly broken away and partly in section, of the caulking device of the subject invention.
FIG. 2 is a fragmentary, greatly enlarged side elevational view, partly broken away and partly in section, of the embodiment of FIG. 1.
FIG. 3 is a vertical sectional view taken on the line 3—3 of FIG. 2, looking in the direction of the arrows.
FIG. 4 is a vertical sectional view taken on the line 4—4 of FIG. 2, looking in the direction of the arrows.
FIG. 5 is a vertical sectional view taken on the line 5—5 of FIG. 2, looking in the direction of the arrows.
FIG. 6 is a fragmentary, greatly enlarged side elevational view, partly broken away and partly in section, of a modification of the invention.
FIG. 7 is a vertical sectional view taken on the line 7—7 of FIG. 6, looking in the direction of the arrows.

Referring now to the drawings, wherein like reference characters designate like or corresponding parts throughout the several views, there is shown in FIG. 1 a preferred embodiment of caulking device 10 of the subject invention consisting of elongated holder 11 and a conventional caulking gun 12 secured thereto. In general, caulking gun 12 includes a semi-cylindrical body 13 with flanged and opposing front and rear caps 14–15, respectively, secured thereto; a U-shaped, upwardly opening slot 16 is provided in the front cap. Cartridge C of conventional disposable type includes tubular body 17 having nozzle 18 mounted on its front end; piston 19 is fitted within the rear end of said body and is adapted to be moved forwardly to extrude caulking compound or other composition in tubular body 17 through nozzle 18. In use, cartridge C is supported on its side on body 13 intermediate caps 14,15 with nozzle 18 extending through slot 16 heretofore mentioned.

Pistol grip 20 is connected to cap 15 with trigger 21 pivotally mounted thereto by means of pin 22; spring 23 carried on pin 22 biases trigger 21 in the extended position. Actuating rod 24, terminating rearwardly in handle 25, includes ratchet teeth 26 on the underside thereof. A pawl (not shown) mounted on trigger 21 cooperates with ratchet teeth 26 whereby upon actuation of said trigger the actuating rod is selectively advanced and piston plate 27 secured to the foremost end of said rod bears against piston 19 in said cartridge.

As best seen in FIG. 2 of the drawings, holder 11 of desired length and preferably of tubular, light weight metallic or plastic composition terminates forwardly in semi-cylindrical base 28 either integrally formed therewith or conventionally secured thereto. An elongated slot 29 of sufficient dimensions to permit the passage of pistol grip 20 and trigger 21 is provided along the medial, longitudinal axis of base 28. One or more bores 30 (see FIG. 5) in body 13, aligned with bores 31 in base 28, each carry a screw 32 with nut 33 threaded thereon to secure the caulking gun to the holder. It is understood that base 28 is of sufficient length to permit actuating rod 24 of the caulking gun to be fully retracted; furthermore, since actuating rod 24 is rotatable by means of handle 25 through an angle of approximately ninety degrees in either direction with respect to the vertical for disengagement of the trigger pawl from the ratchet teeth and allow replacement or removal of the cartridge, edge 34 of said base may not extend above a point so as to interfere with such rotational movement of the actuating rod. An elongated, vertically extending slot 35 in pistol grip 20 and bore 36 in the approximate lower, medial portion of trigger 21 permit passage of cable 37 with crimped sleeve 38 or other fastening means fixedly secured to the foremost end of said cable.

Still referring to FIG. 2, handle and trigger assembly 39 inserts into the rear end of holder 11 and is secured therein by means of machine screws 40 or the like. Handle 41 of assembly 39 is of inverted U-shaped configuration (see FIG. 3) and desirably extends rearwardly in a plane approximately paralleling the longitudinal axis of the holder. Trigger 42, essentially U-shaped in horizontal section and opening rearwardly, is pivotally mounted on handle 41 by means of pin 43 and is adapted to insert into said handle in the fully retracted position. Bracket 44, integrally formed on the lower surface of assembly 39, passes forwardly through slot 45 in the lower, rearmost portion of said holder. Roller 46 is mounted in said braket on axle 47 or the like. The remote end of cable 37 is passed through bore 48 in the medial, lower portion of trigger 42, said cable drawn taut, and crimped sleeve 49 or other fastening means fixedly secured to the remote end thereof; in all positions of trigger 42 the rearmost portion of said cable bears against the lower surface of roller 46.

In use, the operator grasps handle 41 and trigger 42 in one hand and the other hand is placed around any selected portion of holder 11 with said holder normally extending upwardly at an angle of approximately forty-five degrees with respect to the horizontal; for lower work, the user merely lowers the caulking device diagonally across the body. Upon depressing trigger 42, the trigger 21 remotely connected thereto is selectively actuated and caulking compound or other material in the cartridge is accurately dispensed through said nozzle at a remote location.

There is shown in FIGS. 6–7 a modification of the invention wherein handle 50 of inverted U-shaped configuration is fixedly secured to the rearmost, inner portion of holder 11 by means of a plurality of screws 51 with nuts 52 threaded thereon, said handle desirably extending rearwardly along a plane approximately paralleling the longitudinal axis of said holder. Trigger 53, pivotally mounted on said handle by pin 54 or the like is adapted to insert into said handle in the fully retracted position. Inverted U-shaped bracket 55 fixedly secured to the lower, rearmost portion of holder 11 carries roller 56 on axle 57. The remote end of cable 37 connects to trigger 53 in the manner heretofore described.

It is understood, of course, that the foregoing disclosure relates to only preferred embodiments of the invention and that it is intended to cover any changes and modifications of the invention herein chosen for the purposes of the disclosure which do not constitute departures from the spirit and scope of the invention.

What is claimed is:

1. In combination with a conventional caulking gun including a handle and spring biased trigger, a caulking device comprising an elongated holder having first and second ends,
said holder including a base terminating forwardly in said first end,
a slot in said base at said first end adapted to receive said handle and trigger of said caulking gun,
said caulking gun secured to said base,
a second handle secured in proximity to the second end of said holder,
a second trigger pivotally mounted on said second handle, and
a taut cable connecting said second trigger on said holder to said trigger on said caulking gun.

2. The invention of claim 1 further including a roller in proximity to the second end of said holder, said cable adapted to bear against said roller.

3. The invention of claim 1 wherein an opening is provided in the handle of said caulking gun to permit passage of said cable.

4. The invention of claim 1 wherein said second handle extends rearwardly in a plane approximately paralleling the longitudinal axis of said elongated holder.

5. In combination with a conventional caulking gun including a handle and spring biased trigger, a caulking device comprising an elongated holder having first and second ends,
said holder including a semi-cylindrical, longitudinally extending base terminating forwardly in said first end,
a slot in said base at said first end adapted to receive said handle and trigger of said caulking gun,
said caulking gun secured to said base,
a second handle secured to the second end of said holder,
a second trigger pivotally mounted on said second handle,
a roller mounted in proximity to the second end of said holder, and
a taut cable connected to said second trigger on said holder, said cable bearing against said roller and connected to said trigger on said caulking gun.

6. The invention of claim 5 wherein said second handle extends rearwardly in a plane approximately paralleling the longitudinal axis of said elongated holder.

* * * * *